United States Patent [19]

Sprague

[11] 4,380,373
[45] Apr. 19, 1983

[54] CONFORMABLE PROXIMITY COUPLED ELECTRO-OPTIC DEVICES

[75] Inventor: Robert A. Sprague, Saratoga, Calif.

[73] Assignee: Xerox Corporation, Stamford, Conn.

[21] Appl. No.: 194,525

[22] Filed: Oct. 6, 1980

[51] Int. Cl.³ .............................................. G02F 1/03
[52] U.S. Cl. .................................... 350/356; 350/360
[58] Field of Search .............................. 350/360, 356

[56] References Cited

U.S. PATENT DOCUMENTS

| | | | |
|---|---|---|---|
| 3,886,310 | 5/1975 | Guldberg et al. | 350/360 |
| 3,912,370 | 10/1975 | Roach | 350/360 |
| 4,013,345 | 3/1977 | Roach | 350/360 |

*Primary Examiner*—William L. Sikes
*Assistant Examiner*—Léon Scott

[57] ABSTRACT

The electrodes of a electro-optic device having a flexible electrode bearing member, such as a silicon integrated circuit, are re-contoured as required to generally conform to the mating surface of the electro-optic element by resiliently biasing the electrode bearing member against that surface. The bias is suitably supplied by a compressed elastomeric pressure pad which underlies the flexible electrode bearing member. The pressure pad is substantially coextensive with the electrode bearing portion of the flexible member so that a more or less uniform bias is applied throughout that area.

8 Claims, 7 Drawing Figures

CONFORMABLE PROXIMITY COUPLED ELECTRO-OPTIC DEVICES

BACKGROUND OF THE INVENTION

This invention relates to electro-optic devices and, more particularly, to proximity coupled light valves for electro-optic line printers and the like.

It has been shown that an electro-optic element having a plurality of individually addressable electrodes can be used as a multi-gate light valve for line printing. See, for example, a copending and commonly assigned United States patent application of R. A. Sprague et al., which was filed June 21, 1979 under Ser. No. 040,607 on a "TIR Electro-Optic Modulator with Individually Addressed Electrodes; now U.S. Pat. No. 4,281,904." Also see "Light Gates Give Data Recorder Improved Hardcopy Resolution," *Electronic Design,* July 19, 1979, pp. 31-32; "Polarizing Filters Plot Analog Waveforms," *Machine Design,* Vol. 51, No. 17, July 26, 1979, p. 62; and "Data Recorder Eliminates Problem of Linearity," *Design News,* Feb. 4, 1980, pp. 56-57.

As is known, almost any optically transparent electro-optical material can be used as the electro-optic element of such a light valve. The most promising materials now appear to be LiNbO$_3$ and LiTaO$_3$, but there are other materials which qualify for consideration, including BSN, KDP, KD$^x$P, Ba$_2$NaNb$_5$O$_{15}$ and PLZT. In any event, the electrodes of such a light valve are intimately coupled to the electro-optic element and are distributed in non-overlapping relationship widthwise of the electro-optic element (i.e., orthogonally relative to its optical axis), typically on equidistantly separated centers so that there is a generally uniform interelectrode gap spacing.

To perform line printing with a multi-gate light valve of the foregoing type, a photosensitive recording medium, such as a xerographic photoreceptor, is exposed in an image configuration as it advances in a cross line direction (i.e., a line pitch direction) relative to the light valve. More particularly, to carry out the exposure process, a sheetlike collimated light beam is transmitted through the electro-optic element of the light valve, either along its optical axis for straight through transmission or at a slight angle relative to that axis for total internal reflection. Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as "p-modulation" of the light beam) in accordance with the data samples applied to the electrodes as the light beam passes through the interaction region. Schlieren readout optics may be used to convert a phase front modulated light beam into a light beam having a correspondingly modulated intensity profile. For example, the phase front modulated light beam may be imaged onto the recording medium by central dark field or central bright field imaging optics. Alternatively, if the input light beam is polarized, a polarization modulation to intensity modulation conversion process may be performed by passing the polarization modulated output beam through a polarization analyizer. In more generic terms, the p-modulation of the light beam is converted into a correspondingly modulated intensity profile by using "p-sensitive readout optics" to image or project (hereinafter collectively referred to as imaging) the light beam onto the recording medium.

A copending and commonly assigned U.S. patent application of W. D. Turner, which was filed Sept. 17, 1980 under Ser. No. 187,936 on "Proximity Coupled Electro-Optic Devices", shows that the electrodes of an electro-optic device, such as a multi-gate light valve, may be fabricated on a suitable substrate and pressed against or held very close to the electro-optic element to provide what is referred to a "proximity coupling". Another copending and commonly assigned U.S. patent application of R. A. Sprague et al., which was filed Sept. 17, 1980 under Ser. No. 188,171 on "Integrated Electronics for Proximity Coupled Electro-Optic Devices", teaches that more or less conventional LSI (Large Scale Integrated) circuit fabrication techniques may be used to form the electrodes as an extension of, say, a metallization layer of an integrated electrode driver circuit.

SUMMARY OF THE INVENTION

It has been found that proximity coupled electro-optic devices are sensitive to variations in the physical displacement of different points on the electrodes from the electro-optic element, such as may be caused by the mating surfaces of the electrodes and the electro-optic element having non-complementary contours. In accordance with the present invention, it has been recognized that the electrodes of a electro-optic device having a flexible electrode bearing member, such as a silicon integrated circuit, may be recontoured as required to generally conform to the mating surface of the electro-optic element by resiliently biasing the electrode bearing member thereagainst. The bias is typically supplied by a compressed elastomeric pressure pad which underlies the flexible electrode bearing member. In that event, the pressure pad is preferably coextensive with the electrode bearing portion of the flexible member so that a more or less uniform bias is applied throughout that area.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to a single illustrated embodiment, it is to be understood that there is no intent to limit it to that embodiment. On the contrary, the aim is to cover all modifications, alternatives and equivalents falling within the spirit and scope of the invention as defined by the appended claims.

Figure 1:
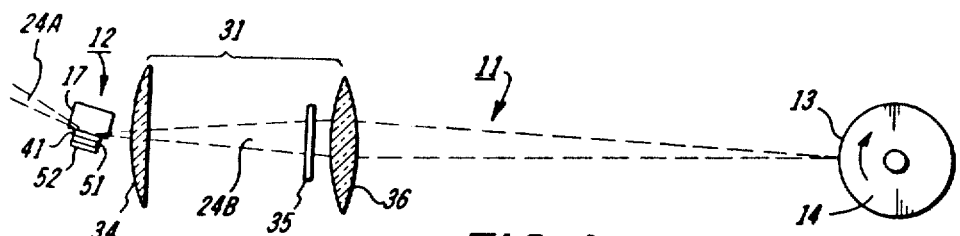
FIG. 1 is a schematic side view of an electro-optic line printer including a proximity coupled TIR multi-gate light valve which embodies the present invention.
Figure 2:
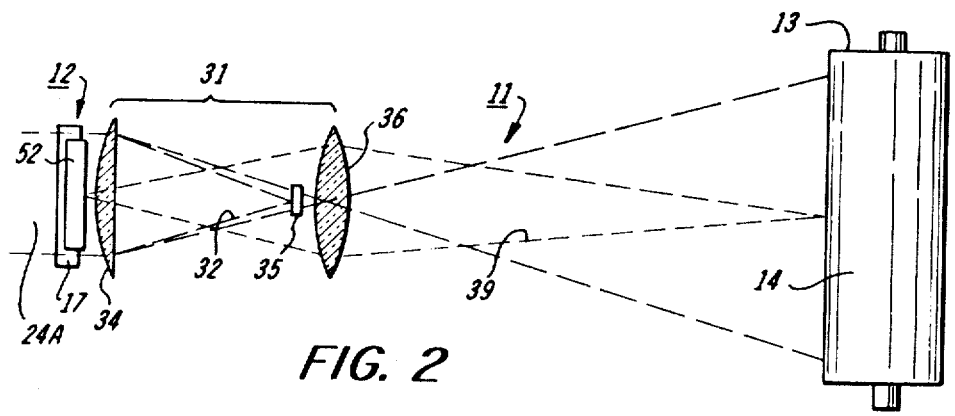
FIG. 2 is a schematic bottom plan view of the electro-optic line printer shown in FIG. 1.

Turning now to the drawings, and at this point especially to FIGS. 1 and 2, there is an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow. However, it will be evident that there are other xerographic and non-xerographic recording media that could be used, including photoconductively coated xerographic belts and plates, as well as photosensitive films and coated papers. The recording medium 13 should, therefore, be visualized in the generalized case as being a photosensitive medium which is exposed in an image configuration while advancing in a cross line or line pitch direction relative to the light valve 12.

Figure 3:
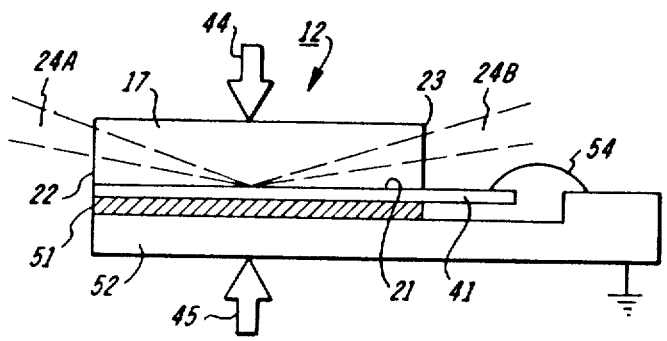
FIG. 3 is an enlarged side view of a TIR light valve for the electro-optic line printer of FIGS. 1 and 2 which shows the resilient biasing of the flexible electrode bearing member that is provided in accordance with this invention.
Figure 4:
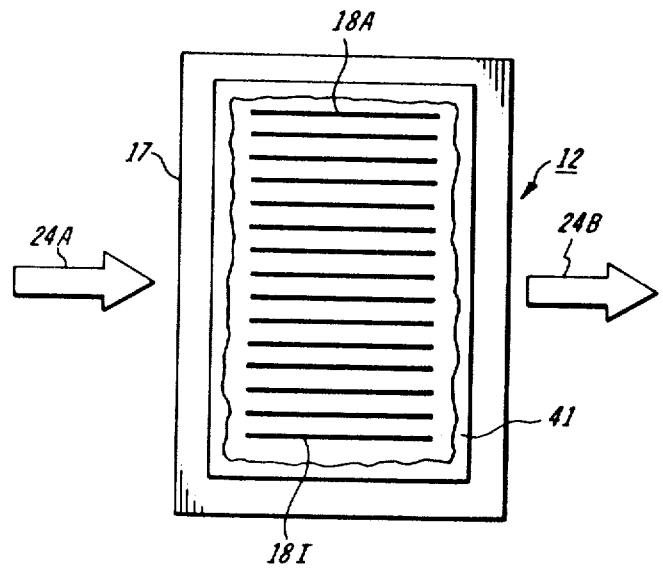
FIG. 4 is an enlarged cutaway bottom view of the TIR light valve of FIG. 3 showing a pattern of individually addressable electrodes.

As shown in FIGS. 3 and 4, the light valve 12 includes an electro-optic element 17 and a plurality of individually addressable electrodes 18a-18i. For a total internal reflection (TIR) mode of operation, such as is illustrated, the electro-optic element 17 suitably is a y cut crystal of, say, LiNbO$_3$ having an optically polished reflecting surface 21 which is integral with and disposed between optically polished input and output faces 22 and 23, respectively. The electrodes 18a-18i are intimately coupled to the electro-optic element 17 adjacent the reflecting surface 21 and are distributed across essentially the full width thereof. Typically, the electrodes 18a-18i are 1-30 microns wide and are on centers which are more or less equidistantly separated to provide a generally uniform interelectrode gap spacing of 1-30 microns. In this particular embodiment the electrodes 18a-18i extend generally parallel to the optical axis of the electro-optic element 17 and have projections of substantial length along that axis. Alternatively, the electrodes 18a-18i could be aligned at the so-called Bragg angle relative to the optical axis of the electro-optic element 17. As will be appreciated, if the electrodes 18a-18i are aligned parallel to the optical axis of the electro-optic element 17, the light valve 12 will produce a diffraction pattern which is symmetrical about the zero order diffraction component. If, on the other hand, the electrodes 18a-18i are at the Bragg angle relative to the optical axis of the electro-optic element 17, the light valve 12 will produce an asymmetrical diffraction pattern.

Briefly reviewing the operation of the line printer 11 depicted in FIGS. 1-4, a sheet-like collimated beam of light 24a from a suitable source, such as a laser (not shown), is transmitted through the input face 22 of the electro-optic element 17 at a grazing angle of incidence relative to the reflecting surface 21. The input light beam 24a is brought to a wedge shaped focus (by means not shown) at approximately the centerline of the reflecting surface 21 and is totally internally reflected therefrom for subsequent transmission through the output face 23. As will be seen, the light beam 24a illuminates substantially the full width of the electro-optic element 17 and is phase front modulated while passing therethrough in accordance with the differentially encoded data samples applied to the electrodes 18a-18i.

Figure 5:
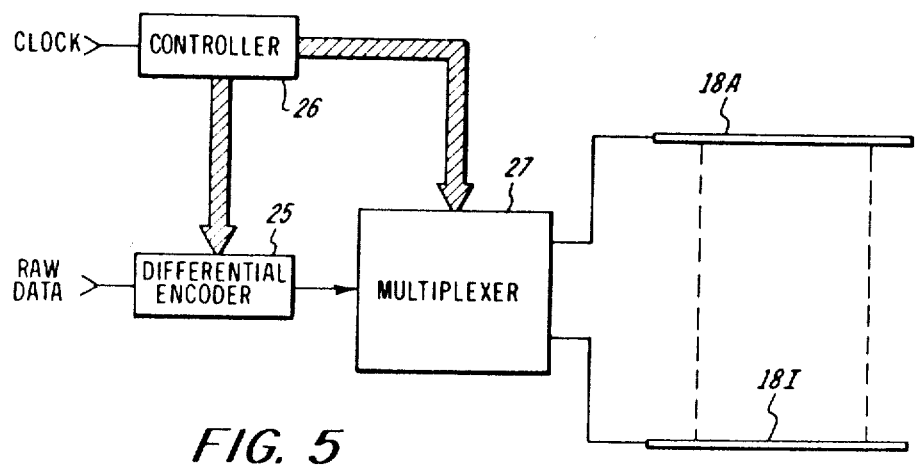
FIG. 5 is a simplified block diagram of a system for applying differentially encoded serial input data to the individually addressable electrodes of the electrode pattern shown in FIG. 4.

More particularly, as shown in FIG. 5, serial input data samples, which represent picture elements for successive lines of an image, are applied to a differential encoder 25 at a predetermined data rate. The encoder 25 differentially encodes the input samples on a line-by-line basis in response to control signals from a controller 26, and a multiplexer 27 responds to further control signals from the controller 26 to ripple the encoded data samples onto the electrodes 18a-18i at a ripple rate which is matched to the data rate. The input data may, of course, be buffered (by means not shown) to match the input data rate to any desired ripple rate. Additionally, the input data may be processed (by means also not shown) upstream of the encoder 25 for text editing, formatting or other purposes, provided that the data samples for the ultimate image are applied to the encoder 25 in adjacent picture element sequence. See, for example, a commonly assigned United States patent application of William Gunning et al., which was filed Apr. 5, 1978 under Ser. No. 893,658.

Differential encoding is described in substantial detail in a copending and commonly assigned United States patent application of W. D. Turner et al., which was filed Sept. 17, 1980 under Ser. No. 187,916 on "Differential Encoding for Fringe Field Responsive Electro-Optic Line Printers." Thus it will suffice to note that each differentially encoded data sample, other than the first sample for each line of the image, has a magnitude whose difference from the previous differentially encoded data sample corresponds to the magnitude of a respective input data sample. The first sample for each line of the image is referenced to a common reference potential, such as ground. Thus, all picture elements are faithfully represented by the electrode to electrode voltage drops that are produced in response to the differentially encoded data.

Figure 6:
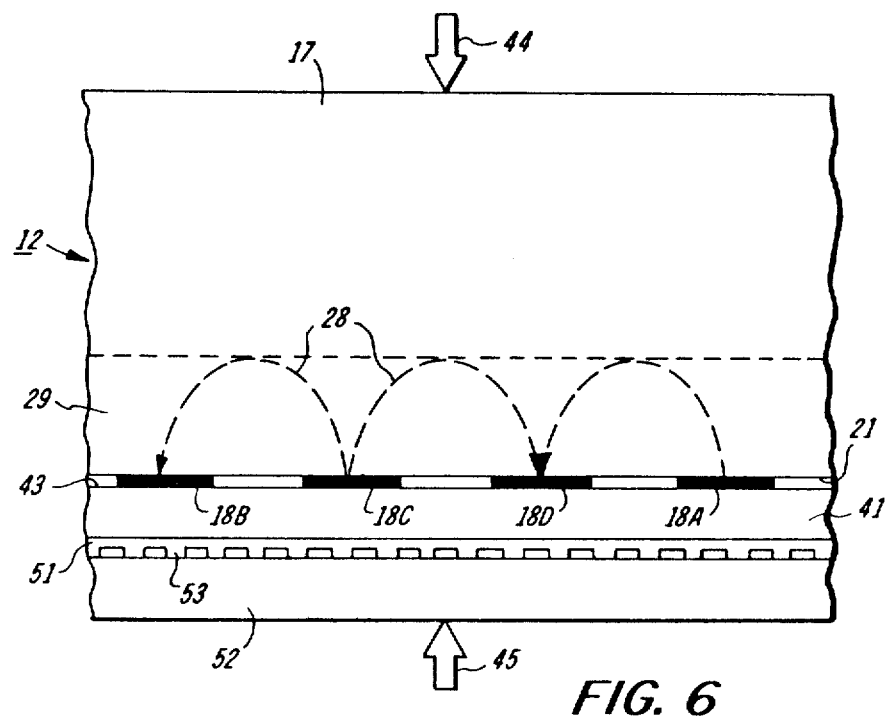
FIG. 6 is an enlarged and fragmentary schematic end view of the TIR light valve shown in FIG. 3 to better illustrate the improved conformance of the electrodes to the mating surface of the electro-optic element that is provided in accordance with this invention.

Referring to FIG. 6, the electrode to electrode voltage drops create localized fringe fields 28 within an interaction region 29 of the the electro-optic element 17, and the fringe fields 28, in turn, cause localized variations in the refractive index of the electro-optic element 17 widthwise of the interaction region 29. The voltage drop between any adjacent pair of electrodes, such as 18b and 18c or 18c and 18d, determines the refractive index for the portion of the interaction region 29 which bridges between those two electrodes. Hence, the refractive index variations within the interaction region 29 faithfully represent the input data samples appearing on the electrodes 18a-18i in differentially encoded form at any given point in time. It, therefore, follows that the phase front of the light beam 24a (FIG. 3) is sequentially spatially modulated in accordance with the data samples for successive lines of the image as it passes through the interaction region 29 of the electro-optic element 17.

Returning for a moment to FIGS. 1 and 2, to expose the recording medium 13 in an image configuration, there suitably are Schlieren central dark field imaging optics 31 which are optically aligned between the electro-optic element 17 and the recording medium 13 for imaging the modulated light beam 24b onto the recording medium 13. The imaging optics 31 convert the spatial phase front modulation of the output beam 24b into a correspondingly modulated intensity profile and provide any magnification required to obtain an image of a desired width. To accomplish that, the illustrated imaging optics 31 include a field lens 34 for focusing the zero order diffraction components 32 of the phase front modulated light beam 24b onto a central stop 35 and an imaging lens 36 for imaging the higher order diffraction components onto the recording medium 13, i.e., the image plane for the light valve 12. The field lens 34 is optically aligned between the electro-optic element 17 and the stop 35 so that substantially all of the zero order components 32 of the modulated light beam 24b are blocked by the stop 35. The higher order diffraction components of the output beam 24b scatter around the stop 35 and are collected by the imaging lens 36 which, in turn, causes them to fall onto the light valve image plane defined by the recording medium 13. Of course, other p-sensitive readout optics could be used to convert the phase front or polarization modulated light beam provided by the electro-optic element 17 into a light beam having a correspondingly modulated intensity profile.

To summarize, as indicated in FIG. 2 by the broken lines 39, each neighboring pair of electrodes, such as 18b and 18c (FIG. 6), cooperates with the electro-optic element 17 and with the p-sensitive readout optics 31 to effectively define a local modulator for creating a picture element at a unique, spatially predetermined position along each line of the image. Accordingly, the number of electrodes 18a–18i determines the number of picture elements that can be printed per line of the image. As will be appreciated, successive lines of the image are printed by sequentially applying successive sets of differentially encoded data samples to the electrodes 18a–18i while the recording medium 13 is advancing in a cross line direction relative to the light valve 12. It should be noted that the differential encoding step may be avoided if ground plane electrodes (not shown) are interposed in alternating paired relationship between the individually addressable electrodes 18a–18i.

Figure 7:
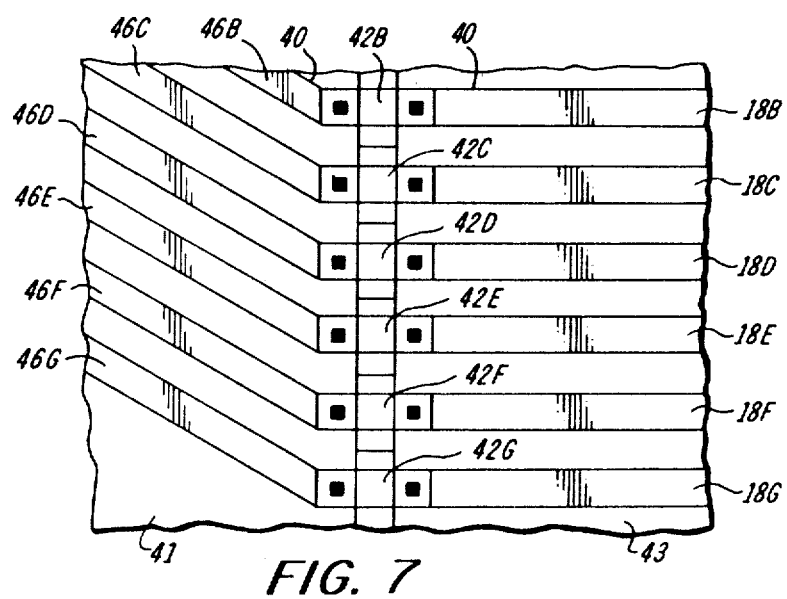
FIG. 7 is an enlarged and fragmentary schematic plan view of the electrode pattern of FIG. 4 as embodied on a silicon integrated circuit.

As most clearly depicted in FIG. 7, the electrodes 18a–18i are advantageously defined by a suitably patterned, electrically conductive layer, generally indicated by 40, which is deposited on an integrated electrical circuit 41, such as a LSI (large scale integrated) silicon circuit, to make electrical contact to the integrated drive electronics 42b–42g. For example, as illustrated, the multiplexer 27 is embodied in the integrated circuit 41, and the electrodes 18a–18i are an extension of the metalization or polysilicon layer 40 which is used to make electrical connections to the output transfer gates or pass transistors 42b–42g and to the other individual components (not shown) of the multiplexer 27. The pass transistors 42b–42g and the other components of the multiplexer 27 are formed on the integrated circuit 41 by using more or less standard LSI component fabrication techniques, and the metalization or polysilicon layer 40 is then deposited on the outer surface 43 of the integrated circuit 41. An etching process or the like is subsequently used to pattern the electrically conductive layer 40 as required to provide electrically independent connections to the electrically independent components of the multiplexer 27 and to form the electrically independent electrodes 18a–18i (only the electrodes 18b–18g can be seen in FIG. 7). For instance, the data transfer lines 46b–46g for the pass transistors 42b–42g are defined in the metalization or polysilicon layer 40 by the same etching process which is used to define the electrodes 18a–18i.

In accordance with the present invention, as shown in FIGS. 3 and 6, the integrated circuit 41 is resiliently biased against the reflective surface 21 of the electro-optic element 17, thereby causing the electrodes 18a–18i to generally conform to the contour of the mating surface 21. As in other proximity coupled electro-optic devices, there is a clamp or similar bonding agent, which is schematically represented by the arrows 44 and 45, for maintaining the electrode bearing surface of the integrated circuit 41 in pressure contact with the reflective surface 21. Moreover, in keeping with this invention, there additionally is a resilient pressure pad 51 or the like for applying a more or less uniform bias to the electrode bearing portion of the integrated circuit 41 so that the integrated circuit 41 flexes as required to cause the electrodes 18a–18i to closely conform to the contour of the reflective surface 21. As will be appreciated, the improved conformance of the electrodes 18a–18i to the mating or reflective surface 21 of the electro-optic element 17 increases the uniformity with which the fringe fields 28 are coupled into the electro-optic element 17, thereby increasing the spatial uniformity of the electro-optic response of the light valve 12. The electrodes 18a–18i or the reflective surface 21 of the electro-optic element 17 may be overcoated with a thin dielectric layer (not shown) if the direct contact of the electrodes 18a–18i with the electro-optic element 17 tends to cause unacceptable levels of spurious amplitude and/or phase modulation of the output light beam 24b.

To carry out this invention, the pressure pad 51 is disposed between the integrated circuit 41 or a flexible package therefor (not shown) and a rigid base plate 52 so that the pressure pad 51 is compressed under the influence of the clamp 44 and 45. The pressure pad 51 underlies the electrode bearing portion of the integrated circuit 41 and is generally coextensive therewith. Thus, the restorative forces generated by the compressed pressure pad 51 are more or less uniformly distributed over the electrode bearing portion of the integrated circuit 41 to urge or bias that portion of the integrated circuit 41 toward the reflective surface 21 of the electro-optic element 17. Due to its inherent flexibility, the integrated circuit 41 flexes as necessary under the influence of that bias to cause the electrodes 18a–18i to generally conform to the contour of the reflective surface 21.

In practice, the pressure pad 51 is preferably fabricated from a readily deformable elastomer so that it deforms as necessary to accomodate any macroscopic variations in the thickness or flatness of the electro-optic element 17, the integrated circuit 41, and the base plate 52. Indeed, the integrated circuit 41 and the base plate 52 are both shown in FIG. 6 as having exagerrated thickness and flatness variations which are taken-up by the compressive deformation of the pressure pad 51. If the pressure pad 51 is composed of a relatively incompressible elastomer, such as silicon rubber, it may be ribbed or otherwise relieved, as at 53 (FIG. 6), to increase its compressibility. Microscopic variations, such as the ordinary surface roughnesses of the electro-optic element 17 and of the electrodes 18a–18i have relatively little effect on the deformation of the pressure pad 51 and can be ignored for present purposes.

The base plate 52 desireably is an electrically conductive member which is referenced to a suitable ground potential so that a ground return path for the integrated circuit 41 may be completed thereto. If the pressure pad 51 is, say, a silicone rubber or a carbon loaded and the base plate 52, the ground return path may be completed through the pressure pad 51. Otherwise, the ground return path may be completed by connecting one or more grounding wires 54 between the substrate of the integrated circuit 41 and the base plate 52.

CONCLUSION

In view of the foregoing, it will be now be understood that the present invention provides a method and means for increasing the spatial uniformity of the electro-optic response characteristics of electro-optic devices which have flexible electrode bearing members, such as silicon integrated circuits. The resilient biasing of the electrode bearing member synergistically takes advantage of the inherent flexibility of the electrode bearing member to re-contour the electrodes for increased conformance with the mating surface of the electro-optic element.

As will be appreciated, a spatially uniform electro-optic response characteristic is an especially desireable attribute of a multi-gate light valve for an electro-optic line printer because spatially discrete portions of such a light valve are responsible for creating separate segments of an image. However, that is only one of the possible applications of this invention.

What is claimed is:

1. In an electro-optic device including
an electro-optic element,
a flexible member, and
a plurality of electrodes supported in spaced apart relationship on said flexible member, said electrodes facing a surface of said electro-optic element and being intimately coupled thereto to proximity couple electric fields into said electro-optic element;
the improvement comprising
a rigid base plate, and
resilient means compressed between said flexible member and said base plate for applying a distributed bias to said flexible member, said bias urging said flexible member toward said surface, thereby causing said electrodes to generally conform to said surface.

2. The improvement of claim 1 wherein
said flexible member is an integrated circuit having an electrically conductive layer patterned to define said electrodes, and
said resilient means is an elastomeric pressure pad, whereby said bias is generally uniformly distributed.

3. The improvement of claim 2 wherein
said base plate is electrically conductive and is referenced to a predetermined ground potential, and
said pressure pad is in electrical contact with said integrated circuit and with said base plate and is composed of an electrically conductive elastomer, whereby a ground return path for said integrated circuit is completed through said pressure pad.

4. The improvement of claim 1 wherein
said electro-optic element is optically transmissive and has a predetermined optical axis,
said surface of said electro-optic element is a reflective surface extending generally parallel to said optical axis,
said electro-optic device further includes means for applying a sheet-like, collimated light beam to said electro-optic element at a grazing angle of incidence relative to said reflective surface, whereby said light beam is totally internally reflected from said reflective surface, and
said electrodes are spaced apart orthogonally relative to said optical axis to provide electric fringe fields for spatially modulating said light beam as said light beam approaches toward and recedes from said reflective surface.

5. The improvement of claim 4 wherein
at least every other one of said electrodes is individually addressable, and
further including means for applying data samples representing respective picture elements of an image to said individually addressable electrodes, whereby said fringe fields modulate said light beam in accordance with said picture element representing data samples.

6. The improvement of claim 5 wherein
said flexible member is an integrated circuit having an electrically conductive layer patterned to define said electrodes, and
said resilient means is an elastomeric pressure pad underlying and generally coextensive with the electrode defining portion of said integrated circuit, whereby said bias is generally uniformly distributed over said portion of said integrated circuit.

7. The improvement of claim 6 wherein
said base plate is electrically conductive and is referenced to a predetermined ground potential, and
said pressure pad is in electrical contact with said integrated circuit and with said base plate and is composed of an electrically conductive elastomer, whereby a ground return path for said integrated circuit is completed through said pressure pad.

8. The improvement of claim 6 wherein said electro-optic element is an electro-optic crystal.

* * * * *